United States Patent [19]

Hegg

[11] Patent Number: 4,895,039
[45] Date of Patent: Jan. 23, 1990

[54] HAND CONTROLLER HAVING PIVOT AXIS FOR MINIMIZING FOREARM MOVEMENT

[75] Inventor: Jeffrey W. Hegg, Clearwater, Fla.

[73] Assignee: Honeywell Inc., Minneapolis, Minn.

[21] Appl. No.: 221,683

[22] Filed: Jul. 20, 1988

[51] Int. Cl.⁴ ............................................. G05G 9/04
[52] U.S. Cl. ................................. 74/471 XY; 74/491; 74/523; 180/333; 244/236; 338/128
[58] Field of Search ................. 74/471 XY, 491, 523; 180/333, 907; 200/6 A; 244/234, 236, 237; 338/128

[56] References Cited

U.S. PATENT DOCUMENTS

| | | | |
|---|---|---|---|
| 3,011,739 | 12/1961 | Boyce et al. | 74/471 XY X |
| 3,028,126 | 4/1962 | Holleman | 244/236 |
| 3,106,371 | 10/1963 | Brannin et al. | 244/236 |
| 3,295,386 | 1/1967 | Menefee et al. | 244/234 X |
| 4,726,248 | 2/1988 | Kawai et al. | 74/471 XY |

FOREIGN PATENT DOCUMENTS

| | | | |
|---|---|---|---|
| 3607700 | 9/1987 | Fed. Rep. of Germany | 244/234 |
| 2109905 | 6/1983 | United Kingdom | 74/471 XY |

Primary Examiner—Allan D. Herrmann
Attorney, Agent, or Firm—Roger W. Jensen

[57] ABSTRACT

A hand controller for a control system, such as a flight control system, includes a control grip and an support assembly for supporting an operator's forearm so that the operator's wrist joint and hand extend forwardly of the support assembly and the operator's hand is positioned to grip the control grip. The controller also includes roll, pitch and yaw gimbal components. The roll gimbal component is movable about a fore-and-aft extending roll axis defined along a base line of the operator's forearm. The pitch and yaw gimbal components are movable about respective side-to-side extending pitch and up-and-down extending yaw axes defined through the center of the operator's wrist joint in orthogonal relation to one another and to the roll axis. The roll, pitch and yaw gimbal components are coupled to one another and to the control grip in a given sequence for facilitating pivotal motion of the operator's hand about the roll, pitch and yaw axes to activate hand control functions with minimal forearm movement. Also, the controller includes a plurality of transducers for sensing movement of the roll, pitch and yaw gimbal components and generating control signals in response thereto.

29 Claims, 2 Drawing Sheets

HAND CONTROLLER HAVING PIVOT AXIS FOR MINIMIZING FOREARM MOVEMENT

CROSS REFERENCE TO RELATED APPLICATIONS

Reference is hereby made to the following co-pending U.S. patent applications dealing with related subject matter and assigned to the same assignee of the present invention:

1. "Three And Four Degree Of Freedom Hand Controllers" by Charles E. Wyllie, assigned U.S. Ser. No. 181,062 and filed Apr. 13, 1988.

2. "Five And Six Degree Of Freedom Hand Controllers" by Charles E. Wyllie, assigned U.S. Ser. No. 181,398 and filed Apr. 13, 1988.

BACKGROUND OF THE INVENTION

1. Field of the Invention

The present invention generally relates to hand controllers and, more particularly, is concerned with a hand controller having pivot axes which minimize forearm motion.

2. Description of the Prior Art

Two and three degree of freedom hand command control systems are well known in the art. Such control systems have commonly been devised utilizing a control grip shaped to fit the operator's hand. The operator typically moves the control grip, and therewith one or more gimbals of a pivotally interconnected sequence of roll, pitch and yaw gimbals for example of a three degree of freedom system, to the right and left to control the roll of an aircraft, to the front and back to control the pitch of the craft, and to twist it clockwise and counterclockwise about a vertical axis to control the yaw of the aircraft.

In some applications, as for example in helicopter control, a fourth command axis is needed to control the up and down motion, i.e. the collective motion of the aircraft. The collective control has heretofore been accomplished either by use of a separate dedicated controller or by adding a fourth axis to a three axis (roll, pitch, yaw) hand controller so that the operator lifts the control grip vertically or pushes it downwardly to produce the desired collective control.

The various hand motions required to effect the desired control grip motion have sometimes produced cross-coupling problems, i.e. where the operator in moving his hand to produce one control movement accidentally also produces another control movement. For instance, in one prior art three degree of freedom hand controller manufactured by the assignee of the present invention and used on the space shuttle Orbiter, and proposed in the cross-references applications for use in conjunction with the controller inventions therein, there is always some forearm motion along with the hand motion.

Specifically, in this particular prior art space shuttle Orbiter hand controller, the fore-and-aft extending roll axis is located below the base of the control grip, the side-to-side extending pitch axis is located through the center of the palm of the operator's hand, and the up-and-down extending yaw axis is located through the center of the control grip. Either slight rotational, side-to-side or up-and-down motion of the operator's forearm is necessary to activate the desired motion of the operator's hand on the control grip to produce any one of these control movements.

In view of the potential for cross-coupling problems with the above-described arrangement of the roll, pitch and yaw axes relative to the operator's control grip hand in the prior art controller, a need exists for an alternative three-axis scheme which will substantially reduce the necessity for forearm motion to activate the required hand motion.

SUMMARY OF THE INVENTION

The present invention provides a hand controller designed to satisfy the aforementioned needs. The present invention provides a unique combination of pivot axes for roll, pitch and yaw movements in a hand controller that minimizes forearm movement. The concept underlying the present invention for minimizing forearm movement is to provide the respective transverse pivot axes for pitch and yaw motions at the center of the wrist joint between the operator's hand and forearm and to provide the pivot axis for roll motion along the base line of the operator's forearm.

The benefits of the present invention are realized particularly when the hand controller is employed in a multi-axis controller using the forearm of the operator for providing additional degrees of freedom, such as in the controllers of the cross-references applications. In such instances, cross-coupling of forearm motion with hand motion will be minimized when activating the hand control functions.

Accordingly, the present invention is directed to a hand controller for controlling operation of an apparatus, comprising in combination: (a) a control grip; (b) means for supporting an operator's forearm so that the operator's wrist joint and hand extend forwardly of the supporting means and the operator's hand can grip the control grip; (c) a first motion coupling component being movable about a fore-and-aft extending roll axis defined along a base line of the operator's forearm when supported by the supporting means; (d) a second motion coupling component being movable about a side-to-side extending pitch axis defined through the center of the operator's wrist joint and in transverse relation to the roll axis when the operator's forearm is supported by the supporting means; and (e) a third motion coupling component being movable about an up-and-down extending yaw axis defined through the center of the operator's wrist joint and in transverse relation to the roll and pitch axes when the operator's forearm is supported by the supporting means. The first, second and third motion coupling components are coupled to one another and to the control grip in a given sequence for facilitating pivotal motion of the operator's hand about the roll, pitch and yaw axes to activate hand control functions with minimal forearm movement.

The hand controller also includes means for sensing movement of the first, second and third motion coupling components and for generating control signals in response thereto.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
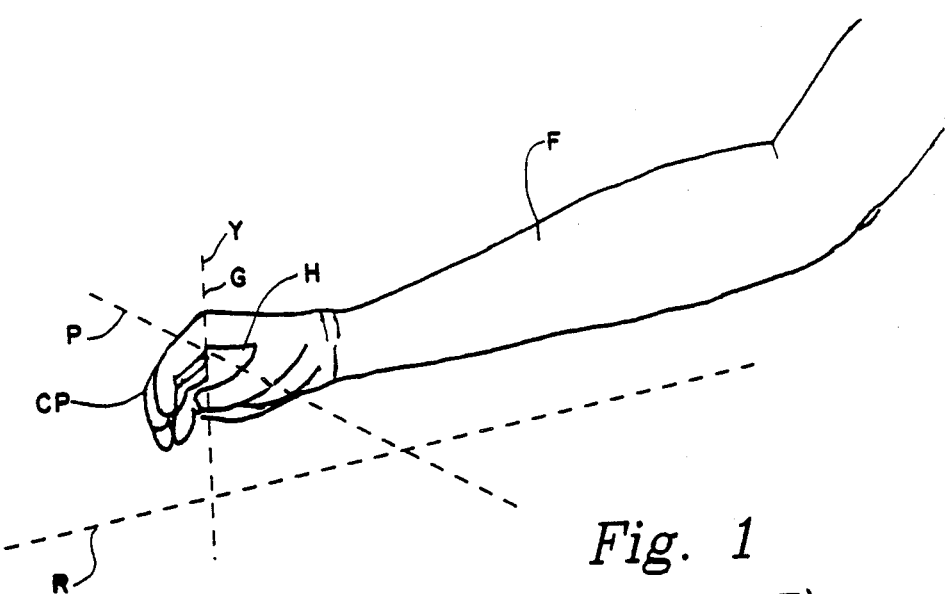
FIG. 1 is a perspective view of the hand, wrist and forearm of an operator and the orientations relative thereto of the roll, pitch and yaw axes defined by a prior art hand controller.
Figure 2:
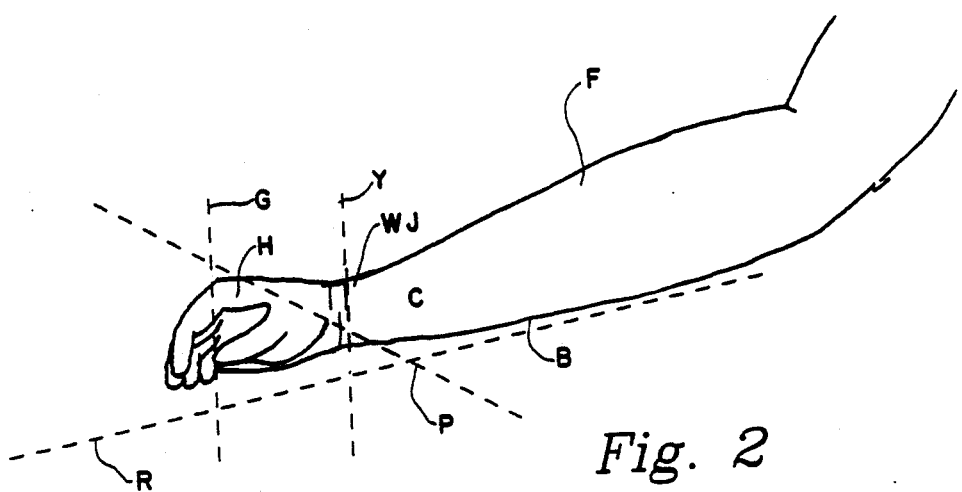
FIG. 2 is a perspective view of the hand, wrist and forearm of an operator and the orientations relative thereto of the roll, pitch and yaw axes defined by the present invention.

Referring now to the drawings, and particularly to FIGS. 1 and 2, with reference to a forearm F, hand H and wrist joint WJ therebetween of a typical operator, there is shown a prior art arrangement of pivot axes in FIG. 1 to be contrasted with a unique arrangement of pivot axes of the present invention in FIG. 2.

In the one prior art space shuttle Orbiter hand controller referred to in the background section supra which provides the prior art arrangement of pivot axes in FIG. 1, there is always some forearm motion along with the hand motion relative to each axis. As depicted in FIG. 1, in the prior art controller, a fore-and-aft extending roll axis R is defined below the base of the control grip (not shown), a side-to-side extending pitch axis P is defined through the center of the palm CP of the operator's hand H, and an up-and-down extending yaw axis Y is defined along the center line G of the control grip and the operator's cupped hand H. Thus, to carry out motion of the operator's hand H on the control grip to produce control movements with respect to any of these axes R, P, Y, it will be observed that it is necessary for the operator's forearm F to undergo some amount of respective side-to-side or up-and-down motion.

To minimize the potential for cross-coupling problems between forearm and hand motions which arise in the above-described prior art arrangement of roll, pitch and yaw axes R, P, Y, the present invention provides a unique combination of roll, pitch and yaw pivot axes R, P, Y, as seen in FIG. 2. The concept underlying the present invention for minimizing forearm movement, as illustrated in FIG. 2, is to provide the respective transverse pivot axes P and Y for pitch and yaw motions so that they extend through the center C of the wrist joint WJ between the operator's hand H and forearm F and to provide the pivot axis R for roll motion along the base line B of the operator's forearm F.

Figure 3:
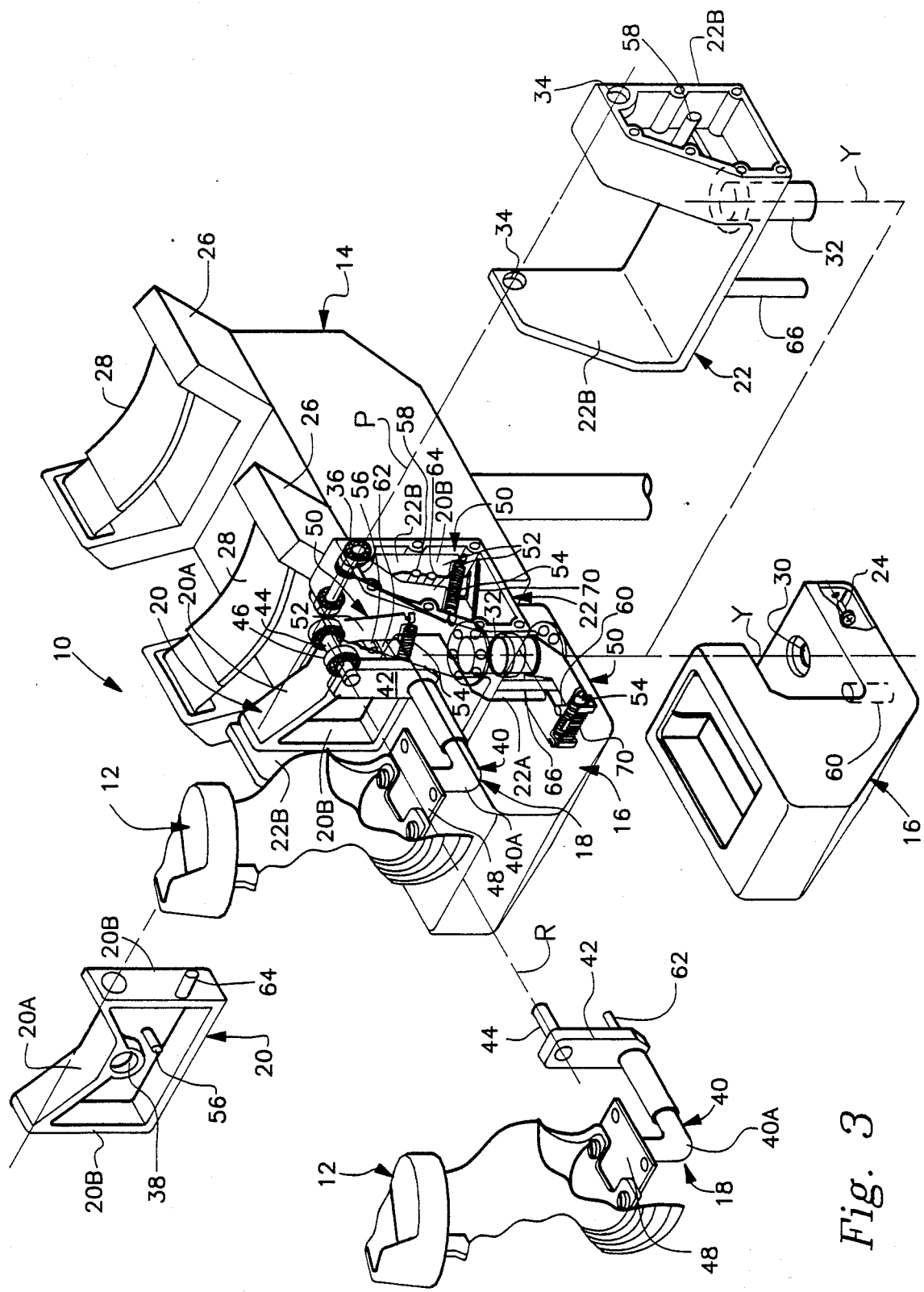
FIG. 3 is a perspective view of a hand controller of the present invention illustrating in both assembled and exploded forms its gimbal components which define the roll, pitch and yaw axes as also seen in FIG. 2.

Turning now to FIG. 3, there is illustrated a control system hand controller, such as for an aircraft flight control system, which is generally designated by the numeral 10 and constitutes an exemplary embodiment of the present invention for establishing the unique arrangement of roll, pitch and yaw axes R, P, Y relative to the operator's hand H, forearm F and wrist joint WJ therebetween as depicted in FIG. 2. In its basic parts, the hand controller 10 includes a control grip 12, supporting means in the form of a forearm support assembly 14 and a controller support housing 16, and first, second and third motion coupling structures in the form of roll, pitch and yaw gimbal components 18,20,22.

The controller support housing 16 is disposed forwardly of, and mounted rigidly by screws 24 to, the front side of the forearm support assembly 14. The forearm support assembly 14 includes a pair of brackets 26 mounted in spaced relation on its top side and supporting straps 28 upon which can rest the operator's forearm F. When the operator's forearm F is properly position on the straps 28, the operator's wrist joint WJ and hand H will extend forwardly of the forearm support assembly 14 and the operator's hand H will be positioned to grip the control grip 12 to activate control motions.

The roll, pitch and yaw gimbal components 18, 20, 22 of the hand controller 10 can be connected in any one of six possible sequences with respect to one another, the control grip 12 and the controller support housing 16 to facilitate activation of the hand controls functions. Only one of these six possible sequences is illustrated in FIG. 3.

As seen in FIG. 3, the roll gimbal component 18 is pivotally movable about the fore-and-aft extending roll axis R which is defined along the base line B of the operator's forearm F (FIG. 2) when the forearm is resting properly on the straps 28 of the support assembly 14. The pitch and yaw gimbal components 20, 22 are pivotally movable about respective side-to-side extending pitch and up-and-down extending yaw axes P, Y which are defined through the center C of the operator's wrist joint WJ (FIG. 2) when the forearm is resting properly on the support assembly straps 28. In such arrangement, the pitch and yaw axes P, Y extend in orthogonal relation to one another and to the roll axis R.

More particularly, the yaw axis Y of the hand controller 10 is defined by the central axis of a hole 30 formed in the controller support housing 16. The yaw gimbal component 22, which overall is U-shaped in configuration, has a bottom 22A rigidly mounting a bearing and stub shaft 32 in depending relation adapted to rotatably fit into the hole 30 in the support housing 16. Thus, the yaw gimbal component 22 is mounted by the controller support housing 16 for pivotal movement about the up-and-down extending yaw axis Y and relative to the support housing 16.

The pitch axis P of the hand controller 10 is defined by the common axis of two aligned holes 34 respectively formed in the upper rear corners of a pair of sides 22B of the yaw gimbal component 22 being fixedly attached in upstanding relation at opposite lateral edges of the bottom 22A thereof. The pitch gimbal component 20 is generally rectangular in configuration with a shallow V-shaped or concave-shaped top portion 20A through which extends and across which lies the wrist joint WJ of the operator when his or her forearm is resting properly on the support assembly straps 28. A pair of bearings 36 (only one being shown) are aligned coaxial with the pitch axis P and coupled between the respective opposite sides 20B, 22B of the pitch and yaw gimbal components 20, 22 for mounting the pitch gimbal component 20 to the yaw gimbal component 22 for pivotal movement about the pitch axis P and relative to the yaw gimbal component 22 and the support housing 16.

The roll axis R of the hand controller 10 is defined by a bore 38 formed at the middle of the concave-shaped top 20A of the pitch gimbal component 20. The roll gimbal component 18 is in the form of an arm 40 having an end plate 42 fixed thereon. A stub shaft 44 fixed to and projecting rearwardly from the plate 42 is pivotally mounted by a bearing 46 in the bore 38 of the pitch gimbal component 20. In such manner, the roll gimbal component 18 is mounted by the pitch gimbal component 20 for pivotal movement about the roll axis R and relative to pitch and yaw gimbal components 20, 22 and the support housing 16. Also, the control grip 12 is attached upright on another plate 48 fixed on an elbow end 40A of the arm 40 of the roll gimbal component 18.

Thus, as can be seen in FIG. 3, the pivotal mounting of the roll gimbal component 18 to the pitch gimbal component 20, provided by the pivotal coupling of the stub shaft 44 to the bearing 46, is at a location disposed between the control grip 12 and the forearm support assembly 14 and below and between a pair of spaced locations of the pivotal mounting of the pitch gimbal component 20 to the yaw gimbal components 22, provided by the spaced bearings 36. Further, the location of the pivotal mounting of the yaw gimbal component 22 to the support housing 16, provided by the stub shaft 32, is spaced below the stub shaft 44 and the bearings 36.

Just described above is one exemplary sequence in which the roll, pitch and yaw gimbal components 18, 20, 22, are coupled to one another and to the control grip 12 and support housing 16 for facilitating pivotal motion of the operator's hand H about the roll, pitch and yaw axes R, P, Y to activate hand control functions. Other sequences are possible within the purview of the present invention without affecting or changing the unique arrangement of the axes relative to the operator's hand H, forearm F and wrist joint WJ therebetween.

Figure 4:
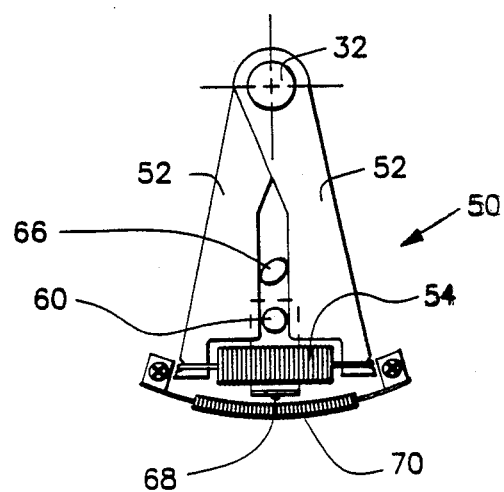
FIG. 4 is an enlarged front elevational view of one of the scissors mechanisms employed in the hand controller of FIG. 3.

Finally, the hand controller 10 includes means for sensing movement of the roll, pitch and yaw gimbal components 18, 20, 22, and for generating control signals in response thereto. The sensing means may take the form of separate electro-mechanical transducer mechanisms 50 associated with the respective gimbal components 18, 20 22. The transducer mechanism 50 being illustrated in FIG. 4 is conventional per se and merely exemplary of ones that can be used. Other types, such as hydraulic or motor driven mechanisms with linear variable differential transformers can be used.

The transducer mechanism 50 includes a pair of scissors elements 52 which at one ends pivot about the respective one of the axes R, P, Y and at the opposite ends are interconnected by a return centering 54. Roll, pitch and yaw dead band pins 56, 58, 60 mounted respectively on the pitch gimbal component 20, yaw gimbal component 22 and support housing 16 determine the initial displacement of the scissors elements 52 of the respective transducer mechanisms 50. Roll, pitch and yaw drive pins 62, 64, 66 mounted respectively on the roll, pitch and yaw gimbal components 18, 20, 22 cause movement of one of the respective scissors elements 52 of the respective transducer mechanisms 50 away from the other. Such movement generates an electrical signal at an electrical pick-off 68 moving with the respective gimbal component and relative to a potentiometer 70 stationarily mounted relative to such movement. As stated above other transducer mechanisms can be used.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

The embodiments of the invention in which an exclusive property or right is claimed are defined as follows:

1. In a hand controller for controlling operation of an apparatus, the combination comprising:
   (a) a control grip;
   (b) means for supporting an operator's forearm so that the operator's wrist joint and hand extend forwardly of said supporting means and the operator's hand can grip said control grip;
   (c) a first motion coupling component being movably mounted at a first location disposed between said control grip and said operator's forearm supporting means and about a fore-and-aft extending roll axis defined along a base line of the operator's forearm when supported by said supporting means;
   (d) a second motion coupling component being movably mounted at a pair of spaced second locations disposed above and at opposite lateral sides of said first location and about a side-to side extending pitch axis defined through the center of the operator's wrist joint and in transverse relation to and above said roll axis when the operator's forearm is supported by said supporting means; and
   (e) a third motion coupling component being movably mounted at a third location disposed below said first location and about an up-and-down extending yaw axis defined through the center of the operator's wrist joint and in transverse relation to said roll and pitch axes when the operator's forearm is supported by said supporting means;
   (f) said first, second and third motion coupling components being coupled to one another and to said control grip in a given sequence for facilitating pivotal motion of the operator's hand about said roll, pitch and yaw axes to activate hand control functions with minimal forearm movement.

2. The hand controller of claim 1 further comprising:
   means for sensing movement of said first, second and third motion coupling components and generating control signals in response thereto.

3. The hand controller of claim 2 wherein said sensing means includes a separate electro-mechanical transducer mechanism associated with each of said motion coupling components.

4. The hand controller of claim 1 wherein said control grip is attached on one of said first, second and third motion coupling components.

5. The hand controller of claim 1 wherein:
   one of said roll, pitch and yaw axes is defined by said supporting means; and
   the one of said first, second and third motion coupling components corresponding to said one axis is mounted by said supporting means for pivotal movement about said one axis and relative to said supporting means.

6. The hand controller of claim 5 wherein:
   another one of said roll, pitch and yaw axes is defined by said one motion coupling component pivotally mounted to said supporting means; and
   another one of said first, second and third motion coupling components corresponding to said another one axis is mounted by said one motion coupling component for pivotal movement about said another one axis and relative to said one motion coupling component and said supporting means.

7. The hand controller of claim 6 wherein:
the remaining one of said roll, pitch and yaw axes is defined by said another one motion coupling component pivotally mounted to said one motion coupling component; and
the remaining one of said first, second and third motion coupling components corresponding to said remaining one axis is mounted by said another one motion coupling component for pivotal movement about said remaining one axis and relative to said one and another one motion coupling component and said supporting means.

8. The hand controller of claim 1 wherein said supporting means includes:
a forearm support assembly; and
a controller support housing rigidly mounted to said forearm support assembly.

9. The hand controller of claim 8 wherein:
said yaw axis is defined by said support housing; and
said third motion coupling component corresponding to said yaw axis is mounted by said support housing for pivotal movement about said yaw axis and relative to said support housing.

10. The hand controller of claim 9 wherein:
said pitch axis is defined by said third motion coupling component pivotally mounted to said support housing; and
said second motion coupling component corresponding to said pitch axis is mounted by said third motion coupling component for pivotal movement about said pitch axis and relative to said third motion coupling component and said support housing.

11. The hand controller of claim 10 wherein:
said roll axis is defined by said second motion coupling component pivotally mounted to said third motion coupling component; and
said first motion coupling component corresponding to said roll axis is mounted by said second motion coupling component for pivotal movement about said roll axis and relative to said second and third motion coupling components and said support housing.

12. The hand controller of claim 11 wherein said control grip is attached on said first motion coupling component.

13. In a hand controller for controlling operation of an apparatus, the combination comprising:
(a) a control grip;
(b) a forearm support assembly for supporting an operator's forearm so that the operator's wrist joint and hand extend forwardly of said support assembly and the operator's hand can grip said control grip;
(c) a controller support housing rigidly mounted to said forearm support assembly forwardly thereof;
(d) a roll gimbal component being pivotally mounted at a first location disposed between said control grip and said forearm support assembly and about a fore-and-aft extending roll axis defined along a base line of the operator's forearm when supported by said support assembly;
(e) a pitch gimbal component being pivotally mounted at a pair of spaced second locations disposed above and at opposite lateral sides of said first location and about a side-to-side extending pitch axis defined through the center of the operator's wrist joint and in transverse relation to and above said roll axis when the operator's forearm is supported by said support assembly;
(f) a yaw gimbal component being pivotally mounted at a third location disposed below said first location and about an up-and-down extending yaw axis defined through the center of the operator's wrist joint and in transverse relation to said roll and pitch axes when the operator's forearm is supported by said support assembly;
(g) said roll, pitch and yaw gimbal components being coupled to one another and to said support housing and said control grip in a given sequence for facilitating pivotal motion of the operator's hand about said roll, pitch and yaw axes to activate hand control functions with minimal forearm movement; and
(h) means for sensing movement of said roll, pitch and yaw gimbal components and generating control signals in response thereto.

14. The hand controller of claim 13 wherein said control grip is attached on one of said roll, pitch and yaw gimbal components.

15. The hand controller of claim 13 wherein: one of said roll, pitch and yaw axes is defined by said support housing; and
the one of said roll, pitch and yaw gimbal components corresponding to said one axis is mounted by said support housing for pivotal movement about said one axis and relative to said support housing.

16. The hand controller of claim 15 wherein:
another one of said roll, pitch and yaw axes is defined by said one gimbal component pivotally mounted to said support housing; and
another one of said roll, pitch and yaw gimbal components corresponding to said another one axis is mounted by said one gimbal component for pivotal movement about said another one axis and relative to said one gimbal component and said support housing.

17. The hand controller of claim 16 wherein:
the remaining one of said roll, pitch and yaw axes is defined by said another one gimbal component pivotally mounted to said one gimbal component; and
the remaining one of said roll, pitch and yaw gimbal components corresponding to said remaining one axis is mounted by said another one gimbal component for pivotal movement about said remaining one axis and relative to said one and another one gimbal component and said support housing.

18. The hand controller of claim 13 wherein:
said yaw axis is defined by said support housing; and
said yaw gimbal component corresponding to said yaw axis is mounted by said support housing for pivotal movement about said yaw axis and relative to said support housing 19. The hand controller of claim 18 wherein:
said pitch axis is defined by said yaw gimbal coupling component pivotally mounted to said support housing; and
said pitch gimbal component corresponding to said pitch axis is mounted by said yaw gimbal component for pivotal movement about said pitch axis and relative to said yaw gimbal component and said support housing.

20. The hand controller of claim 19 wherein:
said roll axis is defined by said pitch gimbal component pivotally mounted to said yaw gimbal component; and
said roll gimbal component corresponding to said roll axis is mounted by said pitch gimbal component for pivotal movement about said roll axis and relative to pitch and yaw gimbal components and said support housing.

21. The hand controller of claim 20 wherein said control grip is attached on said roll gimbal component.

22. In a hand controller for controlling operation of an apparatus, the combination comprising:
(a) a control grip;
(b) means for supporting an operator's forearm so that the operator's wrist joint and hand extend forwardly of said supporting means and the operator's hand can grip said control grip;
(c) a first motion coupling component being movably mounted about a fore-and-aft extending roll axis defined along a base line of the operator's forearm when supported by said supporting means;
(d) a second motion coupling component being movably mounted about a side-to-side extending pitch axis defined through the center of the operator's wrist joint and in transverse relation to said roll axis when the operator's forearm is supported by said supporting means; and
(e) a third motion coupling component being movably mounted about an up-and-down extending yaw axis defined through the center of the operator's wrist joint and in transverse relation to said roll and pitch axes when the operator's forearm is supported by said supporting means;
(f) said first, second and third motion coupling components being coupled to one another and to said control grip in a given sequence for facilitating pivotal motion of the operator's hand about said roll, pitch and yaw axes to activate hand control functions with minimal forearm movement;
(g) said supporting means including a forearm support assembly and a controller support housing rigidly mounted to said forearm support assembly;
(h) said yaw axis being defined by said support housing, said third motion coupling component corresponding to said yaw axis being mounted by said support housing for pivotal movement about said yaw axis and relative to said support housing.

23. The hand controller of claim 22 wherein:
said pitch axis is defined by said third motion coupling component pivotally mounted to said support housing; and
said second motion coupling component corresponding to said pitch axis is mounted by said third motion coupling component for pivotal movement about said pitch axis and relative to said third motion coupling component and said support housing.

24. The hand controller of claim 23 wherein:
said roll axis is defined by said second motion coupling component pivotally mounted to said third motion coupling component; and
said first motion coupling component corresponding to said roll axis is mounted by said second motion coupling component for pivotal movement about said roll axis and relative to said second and third motion coupling components and said support housing.

25. The hand controller of claim 24 wherein said control grip is attached on said first motion coupling component.

26. In a hand controller for controlling operation of an apparatus, the combination comprising:
(a) a control grip;
(b) a forearm support assembly for supporting an operator's forearm so that the operator's wrist joint and hand extend forwardly of said support assembly and the operator's hand can grip said control grip;
(c) a controller support housing rigidly mounted to said forearm support assembly forwardly thereof;
(d) a pivotally-mounted roll gimbal component being pivotal about a fore-and-aft extending roll axis defined along a base line of the operator's forearm when supported by said support assembly;
(e) a pivotally-mounted pitch gimbal component being pivotal about a side-to-side extending pitch axis defined through the center of the operator's wrist joint and in transverse relation to said roll axis when the operator's forearm is supported by said support assembly;
(f) a pivotally-mounted yaw gimbal component being pivotal about an up-and-down extending yaw axis defined through the center of the operator's wrist joint and in transverse relation to said roll and pitch axes when the operator's forearm is supported by said support assembly;
(g) said roll, pitch and yaw gimbal components being coupled to one another and to said support housing and said control grip in a given sequence for facilitating pivotal motion of the operator's hand about said roll, pitch and yaw axes to activate hand control functions with minimal forearm movement; and
(h) means for sensing movement of said roll, pitch and yaw gimbal components and generating control signals in response thereto;
(i) said yaw axis being defined by said support housing, said yaw gimbal component corresponding to said yaw axis being mounted by said support housing for pivotal movement about said yaw axis and relative to said support housing.

27. The hand controller of claim 26 wherein:
said pitch axis is defined by said yaw gimbal component pivotally mounted to said support housing; and
said pitch gimbal component corresponding to said pitch axis is mounted by said yaw gimbal component for pivotal movement about said pitch axis and relative to said yaw gimbal component and said support housing.

28. The hand controller of claim 27 wherein:
said roll axis is defined by said pitch gimbal component pivotally mounted to said yaw gimbal component; and
said roll gimbal component corresponding to said roll axis is mounted by said pitch gimbal component for pivotal movement about said roll axis and relative to pitch and yaw gimbal components and said support housing.

29. The hand controller of claim 28 wherein said control grip is attached on said roll gimbal component.

* * * * *